Aug. 18, 1959   C. K. STENERSON ET AL   2,900,621
LINE SELECTION SYSTEM
Filed Feb. 5, 1954   3 Sheets-Sheet 1

INVENTORS
Charles Keith Stenerson
Herbert C. Waterman
BY
Mueller & Aichele
Attys.

United States Patent Office 2,900,621
Patented Aug. 18, 1959

2,900,621

LINE SELECTION SYSTEM

Charles Keith Stenerson, Chicago, and Herbert C. Waterman, Lincolnwood, Ill., assignors to Motorola, Inc., Chicago, Ill., a corporation of Illinois Application February 5, 1954, Serial No. 408,519

10 Claims. (Cl. 340—166)

This invention relates generally to supervisory control systems and more particularly to an improved system for selecting, controlling and indicating the condition of electrical apparatus located at a remote point.

It is well known to use a supervisory control system for controlling the operation of electrical equipment from a distant position. Such systems have been arranged to provide selection and control of equipment as well as a return indication that the desired operations have been carried out. But when the remote control is refined to this extent, apparatus to perform these functions becomes complex. Accordingly, there is need for circuits requiring fewer and less expensive components.

To simplify such systems it has been proposed to use coded signals comprised of combinations of differing frequencies so that only a single communication channel need be maintained to convey all of the necessary information. Then it is possible to use a pair of signals to select the desired point or device, while other frequencies are used to carry out the function of operating the item selected and to check that the selecting operation was carried out, and to clear or reset the apparatus. However, when a large number of devices are controlled, a large number of frequencies are required and the equipment becomes complicated.

It is an object of the present invention to provide an improved and simplified decoder which may be used with a supervisory control system of the type mentioned.

Another object of the invention is to provide an improved electrical selecting system including a matrix having a plurality of rows and columns of selectable points wherein a single set of frequency responsive devices responds to frequencies which select both the rows and the columns.

A further object is to provide a simple control system which provides selection of points in a matrix and further control of equipment associated with each point, as well as release of the point.

A feature of the invention is the provision of an electrical selection system for selecting individual points in a matrix, which includes a set of frequency responsive means each of which is associated with switch means for establishing a circuit for a group of points in one row and with switch means for establishing a circuit for a group of points in one column, thereby to select a point occurring in the one row and one column.

Another feature is the provision of such a matrix including disabling means to render inoperable the other switch means for points in a row after operation of one such switch means so that operation of another in the set of frequency responsive means may select the desired point by operating the switch means for a column which includes the desired point.

A further feature of the invention is the provision of a point selection and control system with a single set of frequency responsive means usable both to select a set of points containing the desired one, and then to select the desired one from the set, and with a further pair of frequency responsive means, one operable to produce a first condition at the selected point, the other operable to produce a second condition at the point, and both together operable to release the selected point.

Further objects, features and the attending advantages thereof will be apparent upon consideration of the following description when taken in conjunction with the accompanying drawing in which.

In practicing the invention there is provided an improved decoder for a remote control supervisory system which uses signals composed of differing frequency components transmitted in sequence to allow selection of a point to be controlled, to control or change a condition at the point, and to release the point. The decoder includes a set of frequency responsive means each of which is associated with a pair of switch means, closure of one of which establishes a portion of a circuit in a group of points arranged in a row of a matrix, while closure of the other establishes a portion of a circuit in a group of points arranged in a column. The circuit of one point which is in the selected row and column is thereby completely established and holds itself in this condition. This selection of a point is made by transmission of a signal formed of a pair of frequencies in sequence. Disabling means prevents operation of the switch means to establish another row upon reception of the second signal for establishing the column. Additional frequency responsive means may be added to the unit and operation of these singly or in combination may then carry out such functions as controlling equipment associated with the selected point, causing an automatic check of the system or releasing the points selected.

Figure 1:
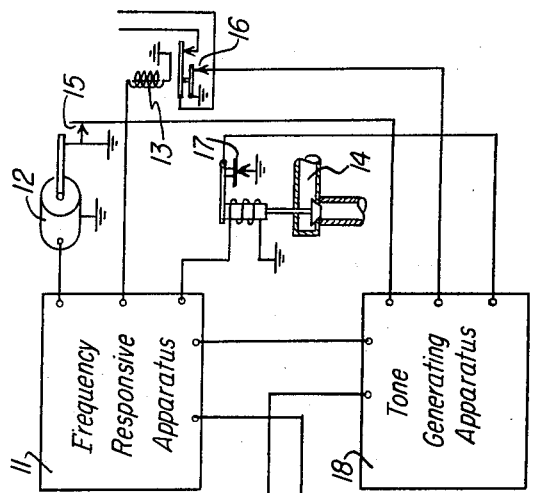
Fig. 1 is a block diagram of a system in accordance with the invention.
Figure 1:
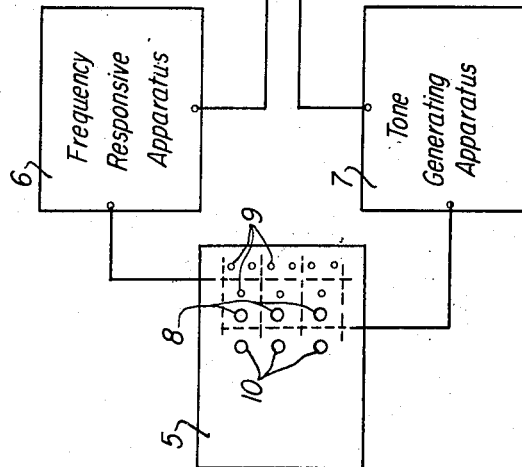

In Fig. 1 there is illustrated a supervisory control system utilizing the selecting apparatus or matrix in accordance with this invention. At the master station there is provided a control panel 5 which is coupled to frequency responsive apparatus 6 and tone generating apparatus 7. The control panel is illustrated as controlling three different equipments with an operating button 8 being provided for selecting each equipment and a plurality of indicating lights 9 showing the condition of the equipment. A plurality of additional buttons 10 for providing desired control of a selected equipment or for providing overall control, may be provided. The operating buttons 8 and 10 control the tones transmitted by the generating apparatus 7, and the frequency responsive apparatus 6 responds to frequencies transmitted from the remote station to control the condition of the indicating lights 9.

At the remote station frequency responsive apparatus 11 is provided which identifies particular equipments and produces controls from signals originating in the tone generating apparatus 7. The controlled pieces of equipment at the remote station are illustrated as a motor 12, a circuit breaker 13, and a valve 14. Each of these equipments includes a switch 15, 16 and 17 respectively, which indicates the condition of the equipment. That is, a centrifugal switch 15 may be applied to the motor indicating whether it is running or not, and similar switches may be provided indicating the condition of the circuit breaker and valves. These switches are connected to circuits controlling the tone generating apparatus 18 at the remote station which sends back tone signals to the frequency responsive apparatus 6 at the master station. The frequency responsive apparatus 6 at the master station and the frequency responsive apparatus 11 at the remote station may include selective apparatus in accordance with the invention which will be described more in detail.

Figure 2:
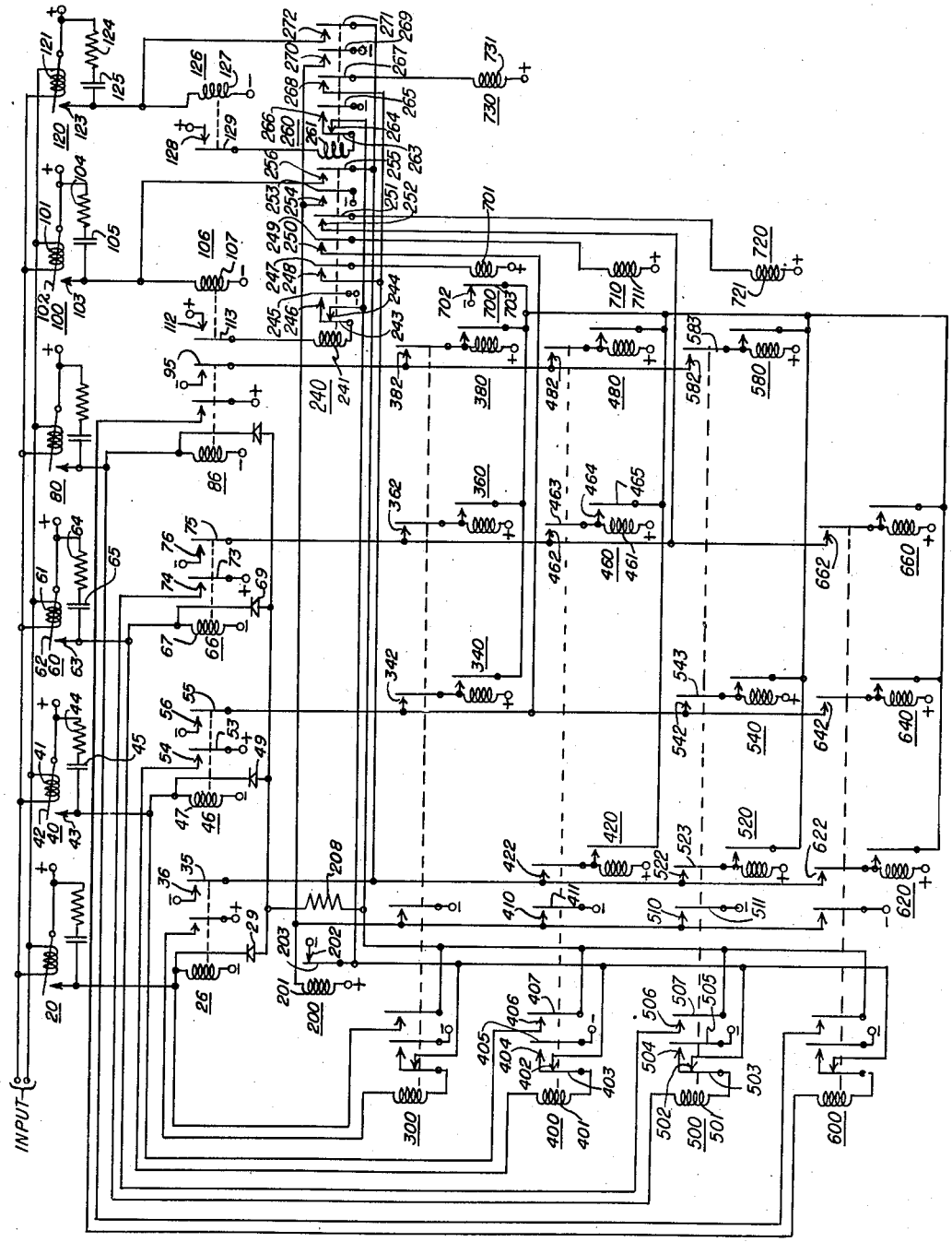
Fig. 2 is a diagram of a remote or controlled station.

In Fig. 2 is shown a schematic diagram of a remote station where various points to be selected and controlled are located. This would be a portion of the apparatus 11. The controllable points are designated as controllable relays 340, 360, 380, 420, 460, 480, 520, 540, 580, 620, 640 and 660 which are arranged in rows and columns. The frequency responsive means 20, 40, 60 and 80 each is associated with a pair of relay devices, one for selecting a row and one for selecting a column. The connection of one set of equipment will now be described; namely, the frequency responder 60, its associated relay 66 and its associated bank relay 500.

The input terminals are connected across the coil 61 of frequency responder 60. Vibrating element or reed 62 is connected to a positive potential source and through resistor 64 and capacitor 65 to the reed contact 63. Contact 63 is also connected to coil 67, contact 506 of relay 500, and rectifier 69. The other side of coil 67 is joined to a negative return or minus and the other side of rectifier 69 joins to arm 507 through resistor 208. Contacts 74 and 76 are connected to coil 501 and to minus respectively. Arm 73 associated with contact 74 is connected to a plus voltage source while arm 75, associated with contact 76, connects to contact 362 of relay 300, contact 462 of relay 400 and contact 662 of relay 600. Both arms 73 and 75 engage their respective contacts in the actuated position of relay 66.

Bank relay 500 has ganged arms 505, 507, 511, 523, 543, and 583 all of which engage their respective contacts in actuated position of relay 500. Arms 505 and 511 are returned to minus and contact 510 is connected to coil 201 while the other side of coil 201 is joined to the plus voltage source. Contact 502 is connected to minus through arm 203 and contact 202 of relay 200. Arm 503 is in contact with 502 in the unactuated position of 500 but is moved away from 502 in the actuated position when arm 505 engages the contact 504 which is fastened to arm 503.

The connection of responder 20 to its associated relays 26 and 300 and to relay 200 is comparable to the hookup described for responder 60. The arm 35 of relay 26, however, is connected to contacts 422, 522 and 622 associated with arms of bank relays 400, 500 and 600 respectively. Similarly the connection of responder 40 to its associated relay 46 and bank relay 400 and of responder 80 to its associated relay 86 and bank relay 600 corresponds to the wiring described for responder 60 with the exception that arm 55 of relay 46 connects to contacts 342, 542 and 642 of bank relays 300, 500 and 600 respectively, and that arm 95 of relay 86 connects to contacts 382, 482 and 582 of bank relays 300, 400 and 500 respectively.

It may be seen that each controllable relay has a coil connected to an arm associated with a bank relay and each of such arms may engage a contact associated with and established by either relay 26, 46, 66 or 86. The remaining connections of each controllable relay are similar and will be described for relay 460. The portion of coil 461 connected to arm 463 also connects to contact 464 which is engageable by arm 465 associated with and actuated by relay 460. The arm 465 is connected to minus through arm 703 and contact 702 of relay 700. The coil 461 also has a connection to the plus voltage source.

Following is a description of the operation to select the point or establish the controllable relay 460, it being understood, however, that operation to select any one of the other points would be the same except that different but corresponding portions of the circuit would be involved. Actuation of relay 460 is accomplished by impressing across the input terminals a signal composed of a first frequency to which only responder 40 is responsive, and this energizes a circuit to close the contact at arm 463 and contact 462, followed by a second frequency to operate only responder 60 to energize a circuit to cause engagement of contact 76 and arm 75 thereby returning one side of coil 461 to minus.

The first frequency component vibrates reed 42 developing a pulsating voltage which is integrated by resistor 44 and capacitor 45 and impressed on coil 47 closing the contacts at 54 and 56. The plus voltage is impressed on coil 401 so relay 400 actuates, and while the minus return for 401 is broken at contact 402 and arm 403, it is kept established through arm 405 and contact 404. Relay 200 is also actuated since the minus return for coil 201 is made through contact 410 and arm 411 and this, by opening the contact 202 and 203, breaks the return for relays 300, 500 and 600 so that they are no longer subject to actuation. It may be noted that arm 463 engages contact 462 when relay 400 is actuated. As reception of the first frequency ceases, the second one is received before reed 42 has stopped vibrating so that the second phase of operation commences.

The second frequency component vibrates reed 62 and causes relay 66 to operate in the same manner that 46 operated when reed 42 was vibrated. This time, however, relay 500 associated with relay 66, does not actuate since the opening of the circuit at 202 and 203 has removed the minus return for coil 501. But arm 75 associated with relay 66 engages contact 76 so that the minus return is put on coil 461 through the previously closed 463 arm. Part of the current from responder 60 passes through coil 67 to energize the same and part passes through rectifier 69, resistor 208, and the contacts at 406 and 407 to keep relay 46 actuated which maintains relay 400 actuated so that arm 463 does not disengage contact 462. Coil 461, once energized, is self-holding since minus is impressed thereon through 464, 465, 703 and 702 and therefore when the second frequency ceases relay 460 will not fall out. Additional contacts and arms may be used in conjunction with relay 460 to carry out a desired function. For example, a pair of contacts may be employed to cause tone generating apparatus 18 to send a signal back to frequency responsive apparatus 6 to light an indicator lamp 9 showing that the point has been selected.

The connection of another pair of frequency responders to allow other operations to be carried out at the remote station will now be described.

The frequency responder 100 has a coil 101 connected across the input terminals and a vibrating reed connected to contact 103 through resistor 104 and capacitor 105. The contact 103 is also connected to coil 107 associated with relay 106 while the other side of coil 107 is connected to the minus return. An arm associated with relay 106 is connected to coil 241 associated with relay 240, and in the actuated position of the relay 106 engages contact 112 which is connected to the positive potential source. Relay 240 has ganged arms 245, 247, 249, 251, 253 and 255. In the actuated position of relay 240 these arms engage contacts 246, 248, 250, 252, 254 and 256 respectively. Arm 243 is in engagement with a contact 244 in the unenergized state of coil 241 but is disengaged therefrom when arm 245 is moved into an actuated position of contact with 246. Contact 244 is connected to arm 203 associated with relay 200 and arm 245 is connected to the minus return. Contact 248 has a connection to arm 35 associated with relay 26, arm 247 has a connection to coil 701 associated with relay 700 and contact 250 has a connection to arm 55 associated with relay 46 and arm 249 has a connection to coil 711 associated with relay 710. Further connection is made between contact 252 and arm 75 associated with relay 66, arm 251 and the coil 721 associated with relay 720 and contact 254 is connected to contact 410 associated with relay 400. Connection of relay 240 is completed by the joining of contact 256 to the contact 103 associated with responder 100 and by connection of arm 255 to arm 407 associated with relay 400. Coils 701, 711 and 721 previously mentioned, all have a terminal connection to the positive potential source.

The connection of responder 120 and relay 126 is similar to the connection of responder 100 and relay 106 just mentioned. The contact 128 associated with relay 126 is returned to the positive potential source and the arm engageable therewith is connected to coil 261 associated with relay 260. The other connection of coil 261 is joined to arm 263 and contact 266 associated with relay 260. Arms 265, 267, 269 and 271 also associated with this relay are ganged together and in the actuated position of this relay engage contacts 266, 268, 270 and 272 respectively. When arm 265 is in the actuated position to engage contact 266, the engagement of arm 263 with contact 264 which is normally made in the unactuated position of relay 260 is broken. There is a connection between contact 123 associated with responder 120 and contact 272 and also a connection of arms 265 and 269 to the minus return. Contact 264 has a connection to contact 244 associated with relay 240 and contact 268 is connected to contact 248 associated with the same relay, while arm 271 is connected to arm 255 also associated with this relay and the connection of relay 260 is completed by joining arm 267 to the coil 731 associated with relay 730. The other terminal of coil 731 has a connection to the positive potential source.

The operation and use of these additional frequency responders will now be described. Reception of a signal which will cause 100 to respond followed by a frequency component to which responder 20 will respond is utilized to release any of the controlled relays which have been previously actuated and self-held. Vibration of reed 102 will cause relay 106 to energize in much the same fashion as vibration of reed 42 caused operation of relay 46 in the previous description. When relay 106 is actuated, a plus potential will be placed on coil 241 through the contact 112 and arm 113 and the minus return of this coil will be established first through arm 203 and contact 202 associated with relay 200 and then as relay 240 picks up through its own contact 246 and arm 245. Then as a signal is received to actuate relay 26 before relay 106 has dropped out, the current to actuate relay 26 will in part pass through rectifier 29, resistor 208, arm 255, and contacts 256 to maintain relay 106 actuated and thus prevent falling out of relay 240. When relay 26 is actuated, the minus return will be established through contact 36, arm 35, contact 248, and arm 247 for the coil 701. This causes actuation of relay 700 thereby disengaging arm 703 from contact 702 which removes the minus return for all the controllable coils such as coil 461. Any of these coils previously self-held will now fall out.

Operation of relay 730 and its associated arms may be used to initiate a check of the remote station by starting a device which will transmit signals back to the master station indicating the condition of each point at the remote station. That is, relay 730 may be utilized to "comb" the entire remote station from the master station. To operate this relay, reception of a signal to cause operation of responder 120 followed by operation of responder 20 is required. When the first frequency component is received, relay 126 is actuated which, through its contact arm 129, places the positive potential on coil 261 thereby actuating relay 260 and partially completing a circuit to coil 731 through the contact arm 267 and the contact 268. Upon reception of the second frequency; that is, the one to which responder 20 is responsive, contact is made through arm 35 and contact 36 placing the minus return on contact 268 thereby completing the circuit to actuate coil 731.

Reception of the frequency to actuate relay 26 also causes relay 126 and thus relay 260 to remain actuated by conduction of current through rectifier 29, resistor 208, arm 271 and contact 272 in the same manner as previously described in connection with relays 26, 106 and 240.

Contacts associated with relay 730 may be used to start a cycle which connects tone generating apparatus 18 through contacts of each controllable relay to indicate at the master station which of such relays are energized or de-energized by changing the condition of certain of indicator lamps 9.

Relays 710 and 720 may be utilized to operate equipment which is associated with a selected relay, such as relay 460, by partially establishing a circuit through additional contacts associated with the controllable relays and completing these circuits to produce the desired result through operation of either of these relays. A signal to cause operation of responder 100 which actuates relay 106 followed by a signal to operate responder 40 which actuates relay 46 would close contacts associated with relay 710 by establishing the circuit to coil 711 through contact arm 249, contact 250, arm 55, and contact 56. Similarly relay 720 may be actuated in response to frequencies to actuate relay 106 and relay 66 by completing the circuit to coil 721 through arm 251, contacts 252, arm 75 and contact 76. That is, once a controllable relay has been selected as previously described, additional contacts associated therewith may be used in conjunction with additional contacts of relays 710 and 720 to operate equipment such as 12, 13 or 14.

In summary of the circuit at the remote station, it may be seen that a signal composed of a pair of frequencies can operate this system to first select and hold selected one or several of a number of points, second, deselect or release all of the points thus held, or third cause operation or deoperation of equipment connected to switches at the selected point, or fourth operate a device which may be used to check through the circuit of the remote station to transmit information as to the condition of all controllable equipment back to the master station.

Figure 3:
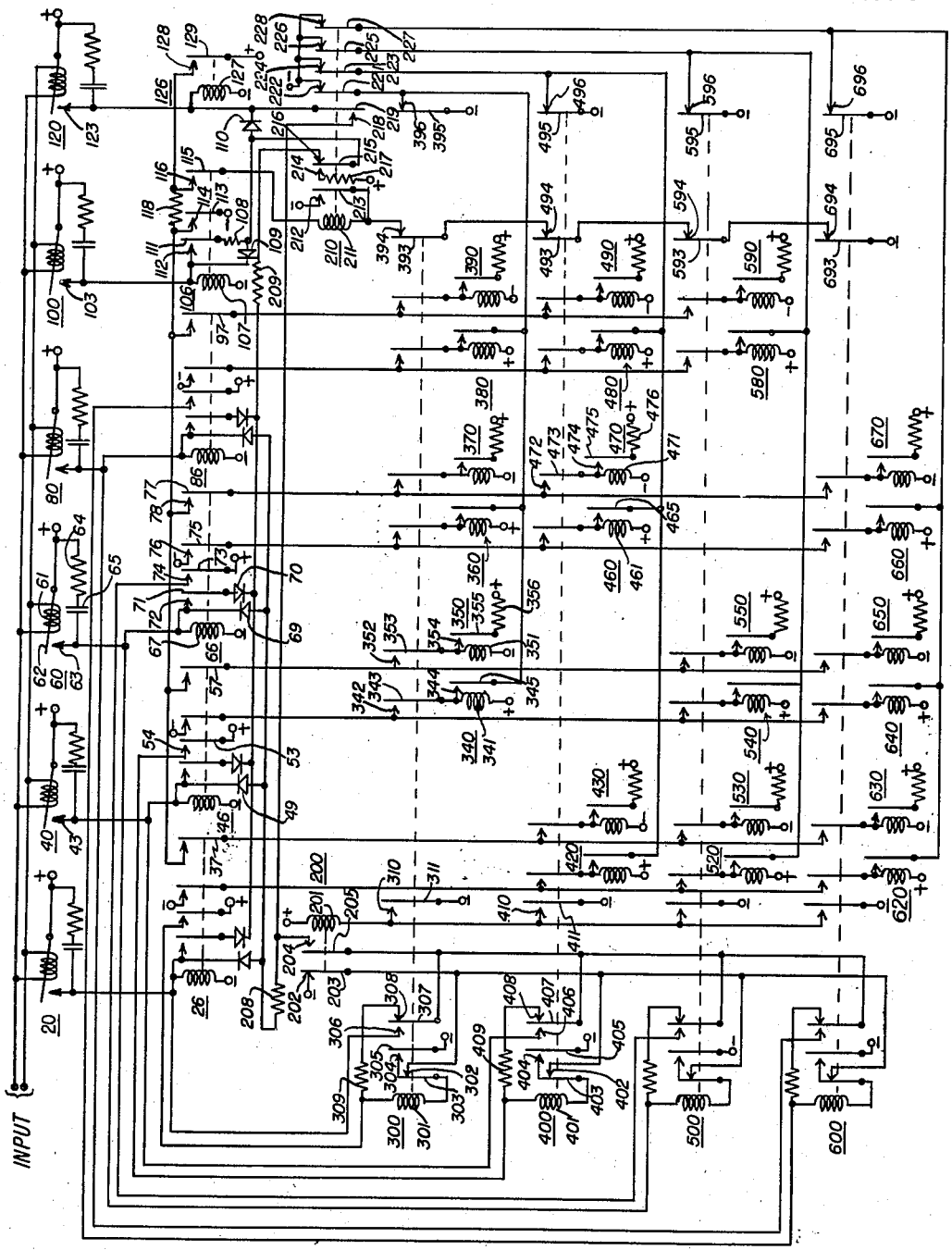
Fig. 3 is a diagram of a master or controlling station.

In Fig. 3 is shown the circuitry for a master station and it may be seen that much of it is similar to that just described for the remote station. Operation of this unit to select and hold selected a point such as that at relay 460 would be the same and selection would involve components numbered the same as in the previous description for establishing relay 460 at the remote station, with an exception to be noted presently.

Point selection at the master station is used as a return check to light an indicator lamp on panel 5 in response to a signal from tone generating apparatus 18 so that an operator may know that the desired point has been selected at the remote station. Also provided at the master station are indicating relays such as 350, 370, 390, 430, etc. These are made responsive to the return signals from the remote station to indicate the condition of the remote equipment such as 12, 13, and 14.

The master station does not have relays 240, 260, 700, 710, 720 or 730 as does the remote station shown in Figure 2. However, there are corresponding controllable relays, frequency responders, bank relays and relays associated with the responders all of which are connected in a manner similar to that of the remote station. There are additional relays associated with the controllable or point relays and there are additional components associated with certain of the relays, connection of which will now be explained.

At the position in the matrix where relay 460 is located there is also located indicating relay 470 in the master station. This has a coil 471 with one side connected to minus and the other side connected to an arm 473 associated with relay 400 and also connected to contact 474 associated with the relay 470. Arm 475 associated with this relay is connected to the positive potential source through resistor 476 and in the actuated position of relay 470 engages contact 474. Contact 472 associated with relay 400 and engageable with arm 473 is connected to arm 77 associated with relay 66.

There is also an additional contact associated with relay 400 namely contact 408 which engages arm 407 of that relay when the relay is deactuated. Contact 408 is connected to contact 54 associated with relay 46 through resistor 409. Arm 407 associated with relay 400 no longer connects through resistor 208 to rectifier 69 but now connects to arm 205 associated with relay 200 which is engageable with contact 204 of that relay which is connected to rectifier 69 through 208. The arm 495 associated with relay 400 and engaged with contact 496 in the deactuated position of 400 is returned to minus.

Relay 66 has an additional contact 72 connected to responder contact 63 and an arm engageable with contact 72 in the actuated position of relay 66, arm 71 connected through a rectifier 70 through resistor 209 to contact 216 associated with a relay 210. Relay 66 also has an additional contact 78 engageable with arm 77 in the actuated position of relay 66 which is connected to contact 114 associated with relay 106.

Bank relays 300, 500 and 600 also have contacts and connections corresponding to those described for bank relay 400, as do relays 26, 46 and 86 have connections and contacts corresponding to those described for relay 66. Relays 370 and 670 have connections corresponding with those described for relay 470. Relays 390, 490 and 590 have connections which also correspond to this description except that the connection corresponding to that of contact 472 previously mentioned is made to arm 97 associated with relay 86 in the case of these relays. The contact in the circuit of relays 430, 530 and 630 corresponding to the contact 472 in the circuit of relay 470 is connected to arm 37 associated with relay 26 while the remainder of the circuitry for these relays, corresponds to that described for relay 470. Also the contact in the circuit of relays 350, 550 and 650 corresponding to contact 472 is connected to arm 57 associated with relay 46, the remainder of the circuitry being similar.

The arm 465 associated with relay 460 connects to contact 496 associated with relay 400 instead of connecting to arm 703 associated with relay 700 as it does in the remote station. Associated with contact 496 is arm 495 which engages this contact in the unactuated position of relay 400.

In the case of the master station the contact 103 connects to contact 112 associated with relay 106 and rectifier 109, instead of contact 256 as in the remote station. Contact 123 associated with responder 120 connects to one side of coil 127 associated with relay 126 while the other side of this coil is returned to minus. Contact 123 also connects to arm 111 associated with relay 106 through resistor 108 and rectifier 110. There is also a connection from this contact to arm 219 associated with relay 210. Arm 129 associated with relay 126 is returned to the plus voltage source and is engageable with contact 128 in the actuated position of relay 126 and contact 128 connects to contact 116 associated with relay 106.

Contact 103 of responder 100 connects to contact 112 associated with relay 106 and is engageable, in the actuated position of this relay, with arm 111. Contact 112 is also connected through rectifier 109 to the resistor 108 and the rectifier 110 and through the rectifier 109 to arm 215 associated with relay 210. Resistor 118 connects between contacts 114 and 116 associated with relay 106 and arms 113 and 115 associated respectively with these contacts are connected respectively to the minus return and to coil 211 associated with relay 210.

Arm 213 associated with relay 210 connects to coil 211 and to contact 394 associated with relay 300 which is engageable in the unactuated position thereof with arm 393 associated with that relay; also arm 393 is connected to contact 494 associated with relay 400 which is engageable in the unactuated position thereof with arm 493 associated therewith, which is connected to contact 594 associated with relay 500 which is engageable in the unactuated position thereof with associated arm 593 which is connected to contact 694 which is engageable in the unactuated position of relay 600 with the arm 693 associated therewith, and arm 693 is returned to minus. In the actuated position of relay 210 arm 213 engages contact 212 which is returned to minus. Arm 215 is engageable in the actuated position of relay 210 with contact 214 which is connected through resistor 217 to the positive potential source. This arm is also engageable with contact 216 in the unactuated position of relay 210. Arm 219 associated with relay 210 is engageable with contact 218 in the actuated position of this relay and contact 218 is connected to contact 204 associated with relay 200. Arms 221, 223, 225 and 227 are engageable with contacts 222, 224, 226 and 228 respectively in the unactuated position of relay 210 and all of these contacts are returned to minus. Arms 221, 223, 225 and 227 are respectively connected to contact 396 associated with relay 300, contact 496 associated with relay 400, contact 596 associated with relay 500 and contact 696 associated with relay 600. All of the arms associated with relay 210 are ganged together to move in unison when coil 211 is energized.

The master station utilizes a controllable relay such as 460 to give an indication by an indicator lamp 9 that a point had been selected at the remote station in response to a return signal from the station to that effect. An indicating relay such as 470 would be used to light a panel lamp to show condition of equipment associated with the corresponding point in the matrix at the remote station in response to a signal from that station. To cause relay 470 to indicate a condition, the reception of the same two signals which would operate relay 460 would be used with the addition of a frequency to cause either responder 100 or 120 to operate. The frequency to cause responder 120 to operate would actuate relay 470 while reception of the frequency to cause responder 100 to operate would deactuate relay 470 which may be seen to be self holding as is relay 460. Further contacts of relay 470 may be connected to lights 9 to give an indication that it is actuated or deactuated.

Reception across the input terminals of a signal to cause operation of relay 460 would operate relay 46 and relay 400 and relay 200 on reception of the first frequency and would hold relay 46 operated and operate relay 66 on reception of the second frequency thereby operating relay 460. If a frequency to operate responder 120 immediately followed, relay 126 would actuate and a portion of the integrated current from contact 123 would pass through rectifier 110, the contacts at 215 and 216, through resistor 209, through a rectifier 70 and contact 72 and 71 to the coil 67 holding relay 66 operated. The plus potential would be impressed upon contact 78 associated with relay 66 through contact 128 and arm 129 associated with relay 126 and since arm 77 is in engagement with contact 78 and arm 473 is in engagement with contact 472, the plus potential would be placed on coil 471 associated with relay 470 and this relay would actuate. It would be self holding through its own contact 474 and arm 475. As the frequency to operate responder 120 ceased, relays 126, 66, 46, 400, and 200 would fall out leaving only relays 460 and 470 still actuated and each would show this to an observer through the lights previously mentioned.

To cause relay 470 to fall out, reception of a signal composed of frequencies to operate relay 460, or to merely select that point in case this relay is already operated, and to operate responder 100 would be required. In this case, relay 46 would operate causing relay 400 to operate, causing relay 200 to operate, relay 66 would operate holding relay 46 operated and on the third signal, relay 106 would be operated in response to actuation of responder 100. This would cause relay 66 to hold by applying plus potential through rectifier 109, contacts 215, 216 through resistor 209 through rectifier 70, through contacts 72 and 71 to the coil 67. Also at this time the minus return is placed upon contact 78 through arm 113 and contact 114 thus causing a short across coil 471 which deactuates relay 470.

The controllable relays such as 460, which are self holding upon operation, may all be cleared by a row at a time. That is, relays 420, 460 and 480 will be cleared at once. This selective clearing is desirable since there may be several remote stations with each one assigned one or more bank relays, such as relay 400, and this would allow the point release indication to be made at the master station by each remote station singly.

Reception of a signal to operate first, responder 100, second, responder 120 and third, the responder associated with the bank relay corresponding to the locked-in point selection indication relays, would be required to clear these relays. For example, to release relays 420, 460 and 480, relay 106 would be operated in response to operation of responder 100 and as relay 126 was operated in response to operation of responder 120, relay 106 would be held by current flow from contact 123 through rectifier 110, resistor 108 and contact arm 111 and contact 112. This causes operation of relay 210 by supplying the positive potential from arm 129 through contact 128 through contact 116, arm 115 and to the coil 211. Since no bank relay is yet operated the minus return for coil 211 is applied from arms 693, 593, 493 and 393. Once operated, relay 210 may supply its own minus return through arm 213 and contact 212. As the frequency is received to cause operation of responder 40 and thus actuation of relay 46, relay 126 will be held in through application of the positive potential from contact 43 through rectifier 49 through resistor 208 through contact 218 and arm 219 to the coil 127. Actuation of relay 46 also supplies the positive potential to coil 401 through arm 53 and contact 54. As before, the minus return for coil 401 is switched from that made at contact 402 and arm 403 to that made at contact 404 and arm 405. As relay 400 actuates, engagement at associated arm 495 and contact 496 is broken, which breaks the minus return for coil 461 by breaking the return through arm 465. It may also be seen that this would break the minus return for coils associated with relays 420 and 480 as well. Note that since relays 300, 500 and 600 were not actuated, the minus returns for coils associated with controllable relays in those rows were not broken since arms 395, 595 and 695 remained engaged with their respective contacts to continue supplying the minus return for these relay coils.

The described remote control apparatus thus provides a system for selecting one or several of any number of remote control points with a minimum of components since the frequency responders and one set of relays are used twice during point selection. The addition of a further pair of frequency responders allows numerous functions to be carried out at selected points so that equipment may be operated and the operation checked from a distance.

While a particular embodiment of the invention has been illustrated and described, changes may be made and it is intended to cover all such changes and modifications in the appended claims.

We claim:

1. A selection system for establishing electrical connection at a desired point in a matrix by a signal including first and second frequency components applied in sequence, said system including in combination, a plurality of frequency responsive means each operable in response to reception of a component of a particular frequency, a first plurality of circuit means each individually coupled to and operated in response to operation of said frequency responsive means and defining one coordinate of the matrix, means including switching means responsive to a first frequency component for operation of one of said first plurality of circuit means and for disabling all of the other of said first plurality of circuit means, and a second plurality of circuit means each individually coupled to and operated in response to operation of a frequency responsive means to which one of said first plurality of circuit means is coupled, said second plurality of circuit means being operated by said frequency responsive means in response to a second frequency component different from the first frequency and received subsequent to reception of the first frequency component, said second plurality of circuit means defining the other coordinate of the matrix, each circuit means of said first plurality having portions cooperating with said circuit means of said second plurality so that a connection is established at a point defined by an operated circuit means of said first and second groups.

2. A selection system for establishing electrical connection at a desired point in a matrix by a signal including components of first and second frequencies applied in sequential order, said system including in combination, a plurality of frequency responsive means each operable in response to reception of a component of a particular frequency, a plurality of relay means individually associated with and operated in accordance with operation of said frequency responsive means and defining one coordinate of the matrix in response to the first frequency component, means responsive to operation of one relay means for disabling non-operated relay means, and a plurality of circuits each individually associated with a frequency responsive means in common with one of said relay means, said plurality of circuits being energized by operation of said frequency responsive means and defining the other coordinate of the matrix in response to the second frequency component, said plurality of circuits including means for maintaining the one relay means operative on reception of the second frequency component, said relay means having contact means cooperating with said circuit means so that a connection is established at a point defined by an operated relay and an energized circuit, whereby the signal component of first frequency energizes one frequency responsive means and the associated relay means and the signal component of second frequency energizes one circuit portion to make a connection at a selected point on the matrix.

3. A control system for selecting a point in a matrix of points in response to a signal including components of first and second frequencies applied in sequence thereto, said system including in combination, a plurality of selector frequency responder means each operable in response to reception of a component of a particular frequency, a plurality of first relay means individually associated with and operated by said selector frequency responder means and having circuit portions establishing respective columns of the matrix upon energization of a first relay means, a plurality of second relay means individually associated with and operated by said first relay means and having sets of contact means establishing respective rows of the matrix upon energization of a second relay means, means responsive to operation of one of said second relay means for disabling other non-operated second relay means, and circuit means associated with a point in the matrix and adapted to be operated by an established row and column thereof, whereby a circuit portion and a contact means cooperate so that a point is selected by reception of a signal component of first frequency to operate a first relay means and its associated second relay means and a signal component of second frequency to operate another first relay means.

4. A selection system for actuating a relay with self holding means which is located at a desired point in a matrix arrangement of such relays, through use of a signal including components of first and second frequencies applied in sequential order, said system including in combination, a plurality of frequency responsive means each operable in response to reception of a component of a particular frequency, a plurality of first relay means individually associated with and operated by said frequency responsive means, a group of self holding relays having circuit portions energized by and associated with said first relay means, a plurality of second relay means individually associated with and operated by said first relay means, each of said second relay means including circuit means adapted to complete one of said circuit portions of said self holding relays, means to prevent operation of additional second relay means when one of same has been operated, circuit means associated with the frequency responsive means to cause, during operation of one of same, an operated second relay means to hold operated its associated first relay means, whereby the signal component of first frequency energizes one frequency responsive means and the associated first relay means which operates a second relay means, and the signal component of second frequency energizes another frequency responsive means and its associated first relay means, and causes the operated second relay means to remain operated through its associated first relay means, thereby energizing a circuit portion and circuit means adapted to complete the same so that a complete connection is established to actuate a self holding relay located at the point defined by relay means operated by the signal of first and second frequencies.

5. A selection system for actuating a self holding relay which is located at a desired position in a matrix arrangement of such relays, said system being operated by a signal including components of first and second frequencies applied in sequential order and including in combination, a plurality of frequency responsive means each operable in response to reception of a component of a particular frequency, a plurality of first relay means individually associated with and operated by said frequency responsive means, a plurality of groups of self holding relays each group having a common energizing circuit partially established by operation of one of said first relay means, a plurality of second relay means, a disabling relay having normally closed contacts forming a return path for all of said second relay means, said second relay means being individually associated with and operated by said first relay means through said normally closed contacts of said disabling relay, each of said second relay means including contacts adapted to complete the common energizing circuit for a self holding relay in each group thereof, said second relay means further having self holding contacts and contacts adapted to energize said disabling relay to open said normally closed contacts thereof, circuit means associated with said frequency responsive means and contacts included with said second relay means to hold an energized first relay means operated during the component of second frequency, whereby the signal component of first frequency energizes one frequency responsive means and the associated first relay means which operates a second relay means and said disabling relay, and the signal component of second frequency energizes another frequency responsive means and its associated first relay means and causes the operated second relay means to remain operated through its associated first relay means, thereby partially establishing a common energizing circuit and completing the same so that a connection is established to actuate a self holding relay located at the point defined by first and second relay means operated by the signal components of first and second frequencies.

6. The control system of claim 3 which includes further relay means, further frequency responder means adapted to operate said further relay means upon energization thereof, and a control circuit having circuit energizing portions therefor coupled through said further relay means to a circuit portion of one of said first relay means, so that operation of said further relay means and said one first relay means actuates said control circuit.

7. The control system of claim 3 in which said circuit means associated with a point includes relay means operated when the point is selected and having self holding circuit means, and the system also including further relay means having contacts, further frequency responder means adapted to operate said further relay means upon energization thereof, and a control producing relay having circuit energizing portions therefor coupled through said contacts of said further relay means to be operated thereby so that operation of said further relay means energizes said control producing relay, said control producing relay having contacts adapted to disable said self holding circuit means of an operated one of said point relay means to release the same.

8. A selection system for establishing a circuit at a desired point in a matrix by a signal including first and second components of different frequency, said system including in combination, a plurality of frequency responsive means adapted to be coupled to a common signal channel, a plurality of first relay means operated individually by said frequency responsive means and each having a plurality of circuit portions associated therewith, disabling relay means having operable circuit portions, a plurality of second relay means with circuit portions for one coordinate of the matrix, circuit means for energizing one of said second relay means through a circuit portion of said disabling relay means upon energization of an associated first relay means in response to the first component, an operated one of said second relay means having contacts to operate said disabling relay means and to provide a circuit portion in substitute therefor to maintain such second relay means operated, a circuit portion of one of said first relay means defining another coordinate of the matrix in response to the second component thereby establishing a point in the matrix, and circuit means energized by the second component and operation of a first relay means by said second component through a circuit portion of one of said second relay means for holding its associated first relay means operated.

9. The selection system of claim 8 which includes further relay means operable in response to operation of one of said frequency responsive means, said further relay means including a circuit portion to maintain operated ones of said first relay means energized and a circuit portion for performing a function at an established point in the matrix.

10. The selection system of claim 8 which includes control circuit means energizable at an established point in the matrix, further relay means operable in response to operation of one of said frequency responsive means, said further relay means having a circuit portion connected in parallel with a circuit portion of said second relay means and in series with said control circuit means, whereby energization of said further relay means and a second relay means deenergizes said control circuit means established at a point associated with such second relay means.

References Cited in the file of this patent

UNITED STATES PATENTS

| | | |
|---|---|---|
| 1,383,750 | Parker et al. | July 5, 1921 |
| 1,786,805 | Wensley | Dec. 30, 1930 |
| 1,917,294 | Carr | July 11, 1933 |
| 2,192,242 | Robinson et al. | Mar. 5, 1940 |
| 2,342,886 | Murphy | Feb. 29, 1944 |
| 2,420,093 | Place | May 6, 1947 |
| 2,617,872 | Herrick | Nov. 11, 1952 |

FOREIGN PATENTS

| | | |
|---|---|---|
| 374,831 | Great Britain | Dec. 12, 1930 |

Disclaimer

2,900,621.—*Charles Keith Stenerson*, Chicago, and *Herbert C. Waterman*, Lincolnwood, Ill. LINE SELECTION SYSTEM. Patent dated Aug. 18, 1959. Disclaimer filed Sept. 5, 1962, by the assignee, *Motorola, Inc.*
Hereby enters this disclaimer to claims 1, 2 and 3 of said patent.
[*Official Gazette October 16, 1962.*]